United States Patent

Avisror et al.

(10) Patent No.: US 9,477,455 B2
(45) Date of Patent: Oct. 25, 2016

(54) PRE-DISTRIBUTION OF ARTIFACTS IN SOFTWARE DEPLOYMENTS

(71) Applicant: CA, Inc., Islandia, NY (US)

(72) Inventors: Yaron Avisror, Kfar Saba (IL); Uri Scheiner, Haifa (IL); Ido Cohen, Tel Aviv (IL)

(73) Assignee: CA, Inc., Islandia, NY (US)

( * ) Notice: Subject to any disclaimer, the term of this patent is extended or adjusted under 35 U.S.C. 154(b) by 71 days.

(21) Appl. No.: 14/621,248

(22) Filed: Feb. 12, 2015

(65) Prior Publication Data

US 2016/0239281 A1 Aug. 18, 2016

(51) Int. Cl.
*G06F 9/445* (2006.01)

(52) U.S. Cl.
CPC . *G06F 8/60* (2013.01); *G06F 8/61* (2013.01); *G06F 8/65* (2013.01)

(58) Field of Classification Search
CPC .............. G06F 8/60; G06F 8/61; G06F 8/65
USPC .................................... 717/172, 177
See application file for complete search history.

(56) References Cited

U.S. PATENT DOCUMENTS

| 8,776,048 B2 * | 7/2014 | Abuelsaad | G06F 9/44505 717/172 |
| 2011/0194858 A1 * | 8/2011 | Rotenstein | H04B 10/801 398/135 |

* cited by examiner

*Primary Examiner* — Anna Deng
(74) *Attorney, Agent, or Firm* — Patent Capital Group

(57) ABSTRACT

A set of artifacts is identified for deployment on a target device in a deployment. The set of artifacts are from a source computing system remote from the target device. A cache device can be determined as corresponding to the target device, the cache device separate from the target device. The set of artifacts are pre-distributed on the cache device in advance of the deployment. The set of artifacts are sent to the cache device from the source computing system to be held at the cache device prior to the artifacts being distributed to the target device. The deployment follows distribution of the set of artifacts on the target device.

16 Claims, 14 Drawing Sheets

FIG. 5D

| RELEASES | ARTIFACTS | REPORTS | ADMINISTRATION | | SUPERUSER ▼ | HELP |

DEPLOYMENTS > DEMO 09042014
DEMO 09042014 (PENDING ARTIFACTS DISTRIBUTION)\EDIT     EXPORT TO PDF  [DUPLICATE] [SAVE AS XML]

DESCRIPTION:                                        DEPLOYMENT PROGRESS
PROJECT:          SPRINT 1 (21)                        ✓ VALIDATION                            (DONE)    570
APPLICATION:      ROBOTS STORE                         ✓ DIST. ARTIFACTS TO EXECUTION SERVERS  (DONE)
ENVIRONMENT:      QA                                   ⊙ DIST. ARTIFACTS TO AGENTS             (PENDING) [⊙ RUN]
TYPE:             MINOR                                   DEPLOYMENT                           (PENDING)
TEMPLATE:         GLOBAL/SCRATCH DEPLOYMENT               POST DEPLOYMENT                      (PENDING)
DEPLOYMENT PLAN:  TEST 050614 9:40                                                ~535
SCHEDULE:         DEFINE SCHEDULE
DEPLOYMENT PROPERTIES
  APPROVER
▶ MORE (1)
                          ~530

[ARTIFACT PACKAGE] [🗔 DEPLOYMENT] [🗔 POST DEPLOYMENT] [⊙ ROLLBACK]
ARTIFACT PACKAGE: BUILD 21 CONTENT
CHOOSE ARTIFACT DISTRIBUTION METHOD [DISTRIBUTE TO AGENTS]
                                   1. DISTRIBUTE TO EXECUTION SERVERS ✓ DONE
                                   2. DISTRIBUTE TO AGENTS
                                                        ~545
ARTIFACTS:
  HTML > INDEX.HTML > 1.0
  WAR > BLOGIC > 6.0
  WAR > COMMON > 6.0
  WAR > REPORTS > 6.0
  WAR > SITE > 5.0

| RELEASES | ARTIFACTS | REPORTS | ADMINISTRATION | | SUPERUSER ▼ | HELP |

DEPLOYMENTS > DEMO 09042014

DEMO 09042014 (DISTRIBUTING ARTIFACTS)                    EXPORT TO PDF [DUPLICATE] [SAVE AS XML]

DESCRIPTION:
PROJECT:         SPRINT 1 (21)
APPLICATION:     ROBOTS STORE
ENVIRONMENT:     QA
TYPE:            MINOR
TEMPLATE:        GLOBAL/SCRATCH DEPLOYMENT
DEPLOYMENT PLAN: TEST 050614 9:40
SCHEDULE:

~530

DEPLOYMENT PROGRESS
✓ VALIDATION                              (DONE)
✓ DIST. ARTIFACTS TO EXECUTION SERVERS    (DONE)
○ DIST. ARTIFACTS TO AGENTS               (RUNNING)
  DEPLOYMENT                              (PENDING)
  POST DEPLOYMENT                         (PENDING)

~535

DEPLOYMENT PROPERTIES
  APPROVER
▶ MORE (1)

| ARTIFACT PACKAGE | ▣ DEPLOYMENT | ▣ POST DEPLOYMENT | ● ROLLBACK |

ARTIFACT PACKAGE: BUILD 21 CONTENT

CHOOSE ARTIFACT DISTRIBUTION METHOD  [DISTRIBUTE TO AGENTS]
1. DISTRIBUTE TO EXECUTION SERVERS ✓ DONE
2. DISTRIBUTE TO AGENTS ○ RUNNING

~545

ARTIFACTS:
HTML > INDEX.HTML > 1.0
WAR > BLOGIC > 6.0
WAR > COMMON > 6.0
WAR > REPORTS > 6.0
WAR > SITE > 5.0

PRE-DISTRIBUTION OF ARTIFACTS IN SOFTWARE DEPLOYMENTS

BACKGROUND

The present disclosure relates in general to the field of computer development, and more specifically, to software deployment in computing systems.

Modern software systems often include multiple programs or applications working together to accomplish a task or deliver a result. An enterprise can maintain several such systems. Further, development times for new software releases are shrinking allowing releases to be deployed to update or supplement a system on an ever-increasing basis. Some enterprises release, patch, or otherwise modify their software code dozens of times per week. Further, enterprises can maintain multiple servers to host their software applications, such as multiple web servers deployed to host a particular web application. As updates to software and new software are released, deployment of the software can involve coordinating the deployment across multiple machines in potentially multiple geographical locations.

BRIEF SUMMARY

According to one aspect of the present disclosure, a set of artifacts can be identified that are to be deployed on a target device in a deployment. The set of artifacts can be from a source computing system remote from the target device. A cache device can be determined as corresponding to the target device, the cache device separate from the target device. The set of artifacts can be caused to be pre-distributed on the cache device in advance of the deployment. The set of artifacts can be sent to the cache device from the source computing system to be held at the cache device prior to the artifacts being distributed to the target device. The deployment follows distribution of the set of artifacts on the target device.

BRIEF DESCRIPTION OF THE DRAWINGS

FIGS. 5A-5I are screenshots of a graphical user interface for use in connection with a software deployment in accordance with at least some embodiments;

Like reference numbers and designations in the various drawings indicate like elements.

DETAILED DESCRIPTION

Figure 1:
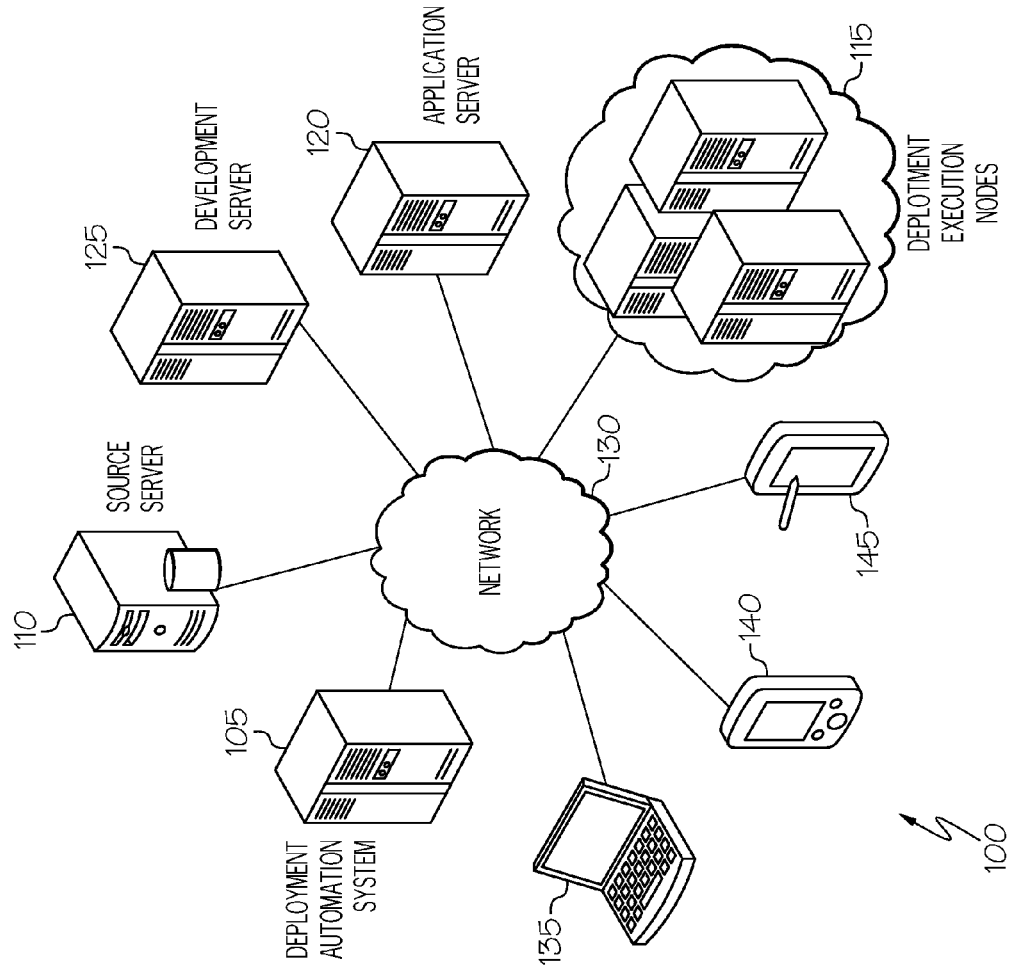
FIG. 1 is a simplified schematic diagram of an example computing system including an example deployment automation system in accordance with at least one embodiment.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely in hardware, entirely software (including firmware, resident software, micro-code, etc.) or combining software and hardware implementations that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, CII, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Referring now to FIG. 1, a simplified block diagram is shown illustrating an example computing environment 100 including a deployment automation system 105, one or more release data source servers (e.g., 110), a set of deployment execution nodes 115, one or more application server systems (e.g., 120), including web servers, application servers, database systems, mainframe systems and other examples. One or more development servers (e.g., 125), among other example pre- or post-production systems, can also be provided that can have software artifacts deployed thereto. Deployment automation system 105 can automate various steps or stages of the deployment of a given software release, such as a new application or program, or updates or patches to an existing application, among other types of releases. For instance, the actual steps of the deployment can be automated, for instance, such that the proper artifacts and targets are automatically accessed and the deployment steps carried out with minimal interaction or involvement by a human user. For instance, automated deployment can be implemented according to the principles and features shown and described in U.S. patent application Ser. No. 14/621,114 filed on Feb. 12, 2015, entitled "Automated Software Deployment," incorporated herein by reference. Software artifacts can include any variety of files that are to be deployed on computing systems to provide software environments such as web applications, search engines, ecommerce applications, customer relationship management applications, and so on. Software artifacts that are to be deployed within a system (e.g., 100) can be hosted by a single source server (e.g., 110) or multiple different, distributed servers, among other implementations.

In some implementations, a deployment automation system 105 can be provided as a centralized service to multiple sub-systems, such as a service to multiple customers, a private service provided to an enterprise system, among other examples. A system can further include various deployment execution nodes 115 that can perform the deployment on one or more target systems (e.g., 120, 125) within the system. In some cases, multiple deployment execution nodes 115 can be provided, such as in various geographical locations, in a virtual machine-based implementation of deployment execution nodes within the cloud, or in various local area networks, among other example implementations. In some cases, a deployment automation system 105 can complete a deployment of a set of artifacts on a given target by causing the artifacts to be downloaded to the target system directly from the source server 110. In other instances, the deployment automation system 105 can first cause the artifacts to be distributed to a local (or otherwise convenient) deployment execution node (e.g., 115) and can complete the deployment thereafter using the copies of the artifacts cached at the deployment execution node. In either case, release data artifacts can be distributed from remote computing devices (e.g., 110 and/or 115) to their intended destinations (e.g., 120, 125) over one or more networks 130, including private and/or public networks. In some instances, the size of the files embodied in the artifacts can be quite significant and impose high demands on network (e.g., 130) and processing resources. Further, in systems where potentially hundreds of deployments are being planned to install new software and update existing software, deployments can be particular disruptive, particularly if the distribution phase of the deployment is relatively lengthy and interrupts operation of the target devices or the software systems hosted by those target devices. Accordingly, in some implementations, artifacts can be strategically pre-distributed to ease the deployment process, for instance, using logic of the deployment automation system.

Computing environment 100 can further include one or more user computing devices (e.g., 135, 140, 145) that can be used to allow users to interface with resources of deployment automation system 105, target servers 115, 120, source server 110, etc. For instance, users can utilize computing devices 135, 140, 145 to build deployment modules for use by the deployment automation system 105 in automated software deployments, set distribution preferences, and schedule or launch an automated deployment through an interface provided in connection with the deployment automation system, among other examples.

In general, "servers," "clients," "computing devices," "network elements," "database systems," "user devices," and "systems," etc. (e.g., 105, 110, 115, 120, 125, 135, 140, 145, etc.) in example computing environment 100, can include electronic computing devices operable to receive, transmit, process, store, or manage data and information associated with the computing environment 100. As used in this document, the term "computer," "processor," "processor device," or "processing device" is intended to encompass any suitable processing apparatus. For example, elements shown as single devices within the computing environment 100 may be implemented using a plurality of computing devices and processors, such as server pools including multiple server computers. Further, any, all, or some of the computing devices may be adapted to execute any operating system, including Linux, UNIX, Microsoft Windows, Apple OS, Apple iOS, Google Android, Windows Server, etc., as well as virtual machines adapted to virtualize execution of a particular operating system, including customized and proprietary operating systems.

Further, servers, clients, network elements, systems, and computing devices (e.g., 105, 110, 115, 120, 125, 135, 140, 145, etc.) can each include one or more processors, computer-readable memory, and one or more interfaces, among other features and hardware. Servers can include any suitable software component or module, or computing device(s) capable of hosting and/or serving software applications and services, including distributed, enterprise, or cloud-based software applications, data, and services. For instance, in some implementations, a deployment automation system 105, source server 110, deployment execution node 115, application server 120, development server 125, or other sub-system of computing environment 100 can be at least partially (or wholly) cloud-implemented, web-based, or distributed to remotely host, serve, or otherwise manage data, software services and applications interfacing, coordinating with, dependent on, or used by other services and devices in environment 100. In some instances, a server, system, sub-system, or computing device can be implemented as some combination of devices that can be hosted on a common computing system, server, server pool, or cloud computing environment and share computing resources, including shared memory, processors, and interfaces.

While FIG. 1 is described as containing or being associated with a plurality of elements, not all elements illustrated within computing environment 100 of FIG. 1 may be utilized in each alternative implementation of the present disclosure. Additionally, one or more of the elements described in connection with the examples of FIG. 1 may be located external to computing environment 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes in addition to those purposes described herein.

Software releases can be frequent, complex, and expensive to deploy. Managing the potentially thousands of software releases, even relating to a single entity's (e.g., enterprise's) system, can be difficult and exact costs on the very operability of the system. Such releases include both releases of new software systems as well as updates or patches to existing software. Valuable information technology (IT) personnel and resources are dedicated within some enterprises to developing and carrying-out these deployments. Traditionally, human users are employed throughout the process of the deployment. Further, human IT resources are not only expensive, but error prone, resulting in some deployments which are incorrect and that may need to be re-deployed, further consuming time and personnel resources. Additionally, some systems may be sensitive to down periods that may be required in order to allow deployment of new software releases on the system. The time, processing, and network capacity needed to perform the deployment may result in the designation of defined deployment windows. IT personnel in charge of the deployment may be directed to ensure that the deployment is completed within this window. Longer deployment windows can thus be costly, not only due to the cost in human and computing resources involved in performing the deployment, but also the costs of allowing the target system or portions therefor to remain down during the deployment window.

Figure 2:
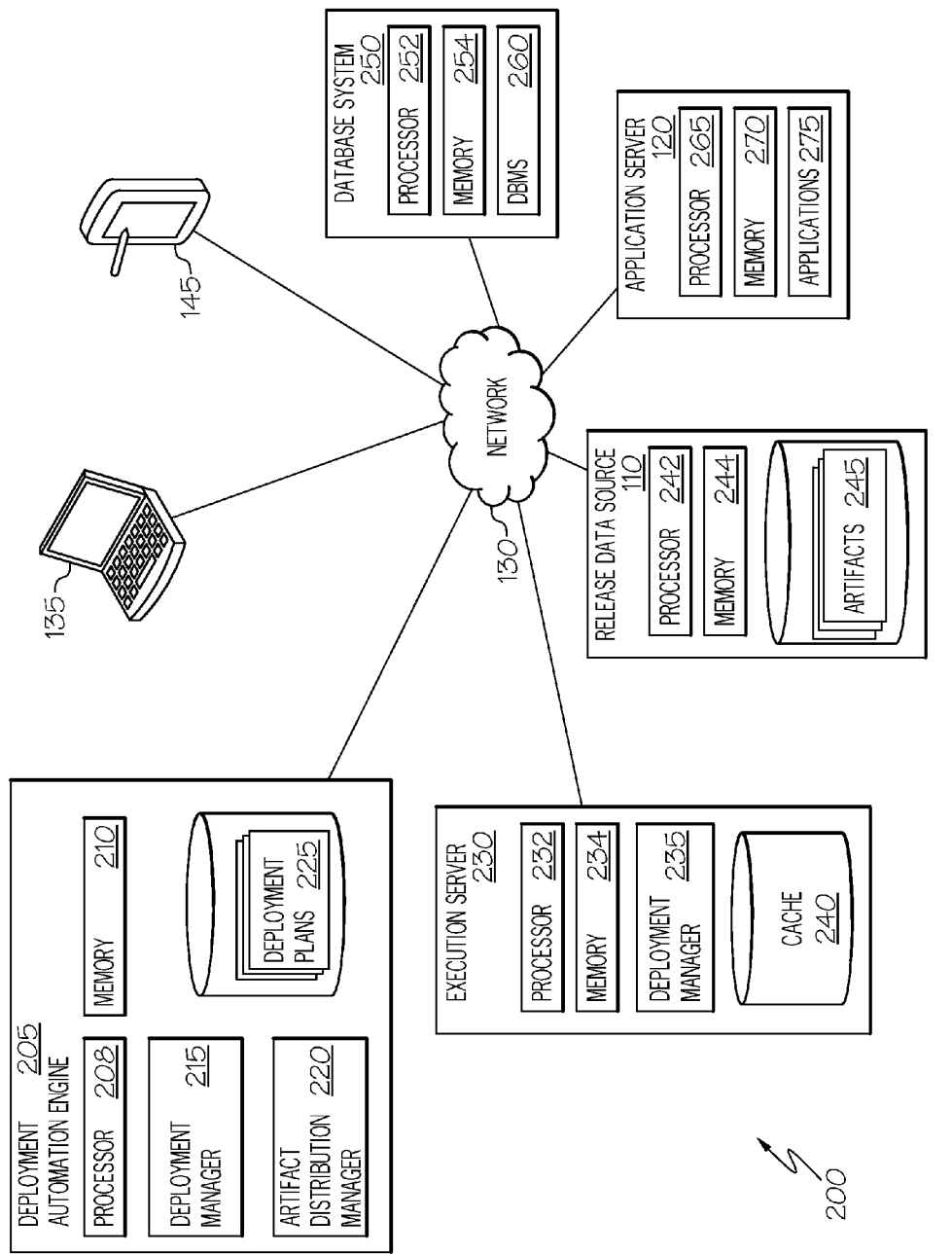
FIG. 2 is a simplified block diagram of an example computing system including an example deployment automation engine in accordance with at least one embodiment.

At least some of the systems described in the present disclosure, such as the systems of FIGS. 1 and 2, can include functionality providing at least some of the above-described features that, in some cases, at least partially address at least some of the above-discussed issues, as well as others not explicitly described. For instance, in the example of FIG. 2, a simplified block diagram 200 is shown illustrating an example environment including an example implementation of a deployment automation engine 205 (e.g., included in a deployment automation system 105) to perform an at least partially automated deployment of a software release. In one implementation, the deployment automation engine 205 can include at least one data processor 208, one or more memory elements 210, and functionality embodied in one or more components embodied in hardware- and/or software-based logic. For instance, a deployment automation engine 205 can include a deployment manager 215 and an artifact distribution manager 220, among potentially other components. Deployment plan data 225 can be accessed (and, in some cases, generated) using the deployment automation engine for use directing deployment activities of the deployment automation activities. For instance, in one example, a deployment plan 240 can embody information describing the steps, or logic, to perform a particular deployment, the artifacts that are to be deployed, and the target systems (and configuration information for use in accessing the targets). The deployment plans 240 can represent a machine-readable module that can be consumed by the deployment automation engine (e.g., using deployment manager 215) to cause the deployment full automate deployment automation engine 205 to perform, without further intervention or guidance by a user, an automated deployment of corresponding artifacts on corresponding targets.

One or more execution servers (e.g., 230) can be provided that can serve as a deployment execution node (e.g., 115) upon which artifacts (e.g., 245) can be cached (using cache 240) in preparation for deployment of the artifacts on a respective target system (e.g., 120, 125). In some instances, execution servers (e.g., 230) can include one or more processors (e.g., 232), one or more memory elements (e.g., 243), and one or more logic components implemented in software and/or hardware. For instance, an execution server 230, in some instances, can include deployment engine logic 235 that can be used, and in some cases directed by deployment manager 215, in automated deployment of artifacts cached at the execution server. In some implementations, the execution server can act as a proxy and pass commands from the central server to actual machines (agents) on which deployment should occur. The execution server can also pass artifacts that should be deployed and cache the same for further use, among other examples.

A deployment automation engine 205 can include artifact distribution manager logic 220 that can be used, in some cases, to distribute, or pre-distribute, artifacts that are to be deployed in a given deployment, to execution servers (e.g., 230) or other nodes, to position the artifacts within a network such that the artifacts can be conveniently accessed and deployed to a target during automated deployment. In some examples, artifact distribution manager 220 can include logic for determining whether a node is available for caching artifacts and can determine which, of a plurality of nodes, would be best or most appropriate to use in a deployment to a given target. For instance, different nodes (e.g., execution servers 230) can be identified for each of a variety of different targets. The node can be identified based on a static association between the node and the target system, such as in cases where the architecture of the system explicitly maps nodes to targets or in systems where a node is provided in proximity to the target, such as in the same local area network (e.g., 130b, 130c, 130d). In other examples, nodes can be dynamically identified as corresponding to a given target, for instance, based on traffic conditions within a network (e.g., 130a-d), the type and size of the artifacts to be deployed, the timing or schedule of the distribution and/or deployment of artifacts, and availability of other nodes within the system, among other example considerations. Artifacts can be pre-distributed to the nodes in advance of other steps in a deployment, such as to perform what can be, in some cases, lengthy or resource intensive distribution or artifact transmission steps that might not necessitate access to the target system itself, in advance of other deployment steps that do involve scheduling access to the target system. Indeed, in some implementations, a deployment window can be defined for a given deployment, such that the deployment is to be completed within the deployment window. Pre-distribution of artifacts to a conveniently accessible node can assist in reliably completing the deployment within such a scheduled window, among other example benefits.

One or more release data sources (e.g., 110) can be provided. A release data source can be a server including at least one processor device 242 and one or more memory elements 244 to include logic for receiving, maintaining, and eventually sending various software artifacts in release deployments within the system. In some cases, a single release data source can be maintained as a repository for all releases that are to be performed for a system. In other cases, multiple release data sources can be provided. Copies of developed release artifacts 245 can be deposited in the release data sources (e.g., 110) of a system. In instances where artifacts 245 are sourced from multiple different data sources (e.g., 110), artifact distribution manager 220, in determining which of a set of nodes to distribute artifacts to in a deployment, can additionally consider the location (e.g., geographically and/or within a network) of the source when selecting the appropriate node for a deployment on a given target device. Further, network connections and conditions connecting a given source (e.g., 11) with a given node (e.g., 230) can also be considered to assist in scheduling and performing a distribution of artifacts to be deployed on a given target system (e.g., 120, 250).

A deployment automation engine 205 can access and utilize environmental data describing various target systems on which artifacts may be deployed and use this environmental data to assist in automating deployment of the artifacts. For instance, environmental data may identify and describe the address, types, and configuration parameters of an application server (e.g., 120), database system (e.g., 250), or other system. Such information can be used, in some cases, to allow the deployment automation engine 205 to access and make changes to various components of a software system, including installing software release artifacts to the accessible components. Further, environmental data can be leveraged to make determinations concerning pre-distribution of artifacts to a given target system. For instance, artifact distribution manager 220 can consume environmental data to identify which target device(s) are to be accessed during a deployment, where the target devices are located, how to access these targets, and what network characteristics exist for moving artifacts 245 from their source (e.g., 110) to the targets (e.g., 120, 250). Accordingly, environmental data can be consumed to determine a set of nodes to be used in a pre-distribution of artifacts to targets described in environmental data.

The environment shown and described in connection with the example of FIG. 2 can further include other systems and sub-components. For instance, an application server 120 can include, for instance, one or more processors 265, one or more memory elements 270, and one or more software applications 275, including applets, plug-ins, operating systems, and other software programs that might be updated, supplemented, or added using an automated deployment. Some software releases can involve updating not only the executable software, but supporting data structures and resources, such as a database. Accordingly, in one example, a database system (e.g., 250) can, in some examples, be targeted together with application server 120 in connection with a single deployment, the database system including one or more processors 252, one or more memory elements 254, and a database management system 260 managing one or more databases and their composite tables. Depending on the type of the system targeted in a deployment, the type and content of configuration data (as identified in environmental data modules) may vary substantially in accordance with the nature of and mechanisms for accessing the respective system. User endpoint devices (e.g., 135, 145) can also be provided to allow users to interface with one or more of the systems in the environment shown and described in FIG. 2.

It should be appreciated that the architecture and implementation shown and described in connection with the example of FIG. 2 is provided for illustrative purposes only. Indeed, alternative implementations of an automated deployment system can be provided that do not depart from the scope of this Specification. For instance, at least one of the components illustrated in FIG. 2 can be included in, combined with, or hosted on the same machine as another of the example components, including deployment automation engine 205. Additionally, a centralized deployment automation system can be provided, in some implementations, as a service capable of providing automated deployments to a variety of different systems owned by multiple different entities and/or deploying release artifacts developed by a variety of different vendors and sources. A centralized system can leverage deployment plan data generated in other deployments for or on behalf of multiple different entities, among other potential advantages. In other instances, a deployment automation system can be a private or enterprise-specific implementation handling deployments of software developed by and/or targeting systems of a single entity, among other examples.

Figure 3:
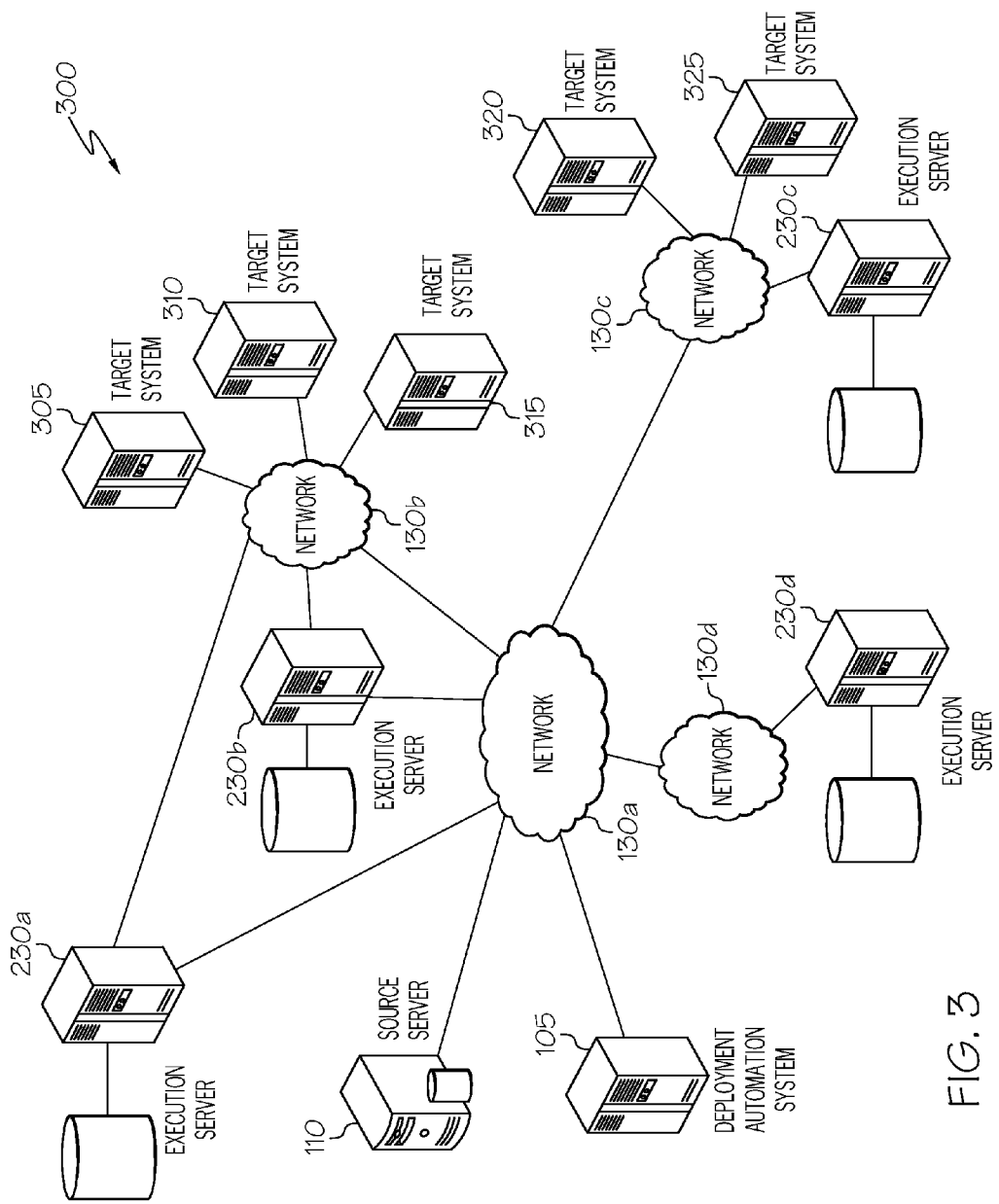
FIG. 3 is a simplified block diagram illustrating an example system including multiple deployment nodes in accordance with at least one embodiment.

Turning to FIG. 3, a simplified block diagram 300 is shown illustrating an example system, such as an enterprise network, whereon releases can be distributed and deployed under direction of an example deployment automation system 105. The system can include multiple different computing devices (e.g., 305, 310, 315, 320, 325) each hosting one or more software programs. In some instances, more than one of the computing devices (e.g., 305, 310, 315, 320, 325) can each host a copy or version of the same software program or system. For instance, one computing device may host a quality assurance version, another the development version, another the production version, and so on. In another example, a web application or other software system can be mirrored on multiple different devices (e.g., 305, 310, 315, 320, 325). In other instances, different programs can be hosted on each of the various computing devices, and so on.

In the example illustrated in FIG. 3A, the system further includes multiple execution servers (e.g., 230a-d) that may each serve as a cache node for pre-distributing artifacts that are to be deployed in an upcoming deployment. The steps of the deployment can be performed automatically by the deployment automation system and can utilize copies of the artifacts stored at a corresponding cache node (e.g., 230*a-d*) to perform the deployment. In some instances, deployment automation system 105 can include logic to perform one or more algorithms to calculate, or otherwise determine, cache nodes (e.g., 230*a-d*) that are to correspond with a particular target system (e.g., 305, 310, 315, 320, 325) in a deployment. In one example, each target system (or portion or component of a target system) can be assigned a particular corresponding node that is to be used anytime a pre-distribution of artifacts is to be performed in a deployment. Such a node may be present within a subsystem, local area network, or geographical area of the target, among other examples.

In other cases, node assignments can be dynamic and based on conditions within the system's network connections, conditions of the deployment, and/or artifacts to be deployed. For instance, a deployment may be scheduled to be completed during a particular time window. A deployment automation system 105 can determine the location(s) of the target device(s) in the deployment and identify the source(s) (e.g., 110) of the artifacts to be deployed. The deployment automation system 105 can further determine what nodes would allow, would likely allow, or most likely allow the designated artifacts to be downloaded to them from their corresponding source(s) in advance of the scheduled window. Further, the deployment automation system 105 can determine, for each computing device or subsystem targeted in a particular deployment, which node would allow for the most convenient and/or efficient access during the deployment, such that the artifacts are easily accessible for deployment on the corresponding targets. Accordingly, in connection with determining which nodes to assign to which target for pre-distribution of corresponding artifacts in a deployment, the deployment automation engine can consider and access (and/or collect) data describing conditions corresponding to the respective capacity and availability of the nodes, the bandwidth of network communication channels connecting the source(s) to the various nodes, the proximity (e.g., geographically or within the network) of nodes to their targets, among other factors.

As an example, artifacts can be hosted at a source server 110. A first deployment can be scheduled to deploy the artifacts to a target that includes both a webserver hosted by target system 310 and a database server hosted by target system 315. A portion of the artifacts are to be deployed to target system 310, and another portion to target system 315. In this example, the artifacts are selected to be pre-distributed to nodes corresponding to devices 310, 315 in connection with the deployment. Accordingly, the deployment automation system 105 can assess the system and determine that execution server 230*a* is to serve as a node to cache the portion of artifacts destined for target system 310 and that a different execution server 230*b* is to cache the other portion of artifacts destined for target system 315. The deployment automation system 105 can cause the corresponding artifacts to be transmitted (e.g., over network 130*a*) to execution servers 230*a* and 230*b* in advance of the deployment. The artifacts can then be distributed from the conveniently located nodes 230*a,b* to the target devices 310, 315 when the target devices 310, 315 become available for the distribution and can be deployed onto the targets.

Other deployments can involve other artifacts targeting other target devices (e.g., 305, 320, 325). Some of these deployments may make pre-distribute artifacts to corresponding nodes (e.g., 230*a-d*), while others may simply distribute the artifacts directly to the targets. In some cases, pre-distributions of artifacts in different deployments to the same target device may be cached in different nodes, despite the target being the same. In some instances, multiple target devices in a deployment can all make use of the same node, based on an assessment by a deployment automation engine, and so on. Further, in some cases, execution servers (e.g., 230*d*) can be provided as cloud based nodes, while in other examples, execution server nodes (e.g., 230*a-c*) can be connected to the same local networks (e.g., 130*b,c*) as one or more potential target devices, among other architectures, configurations, implementations, and examples.

Figure 4:
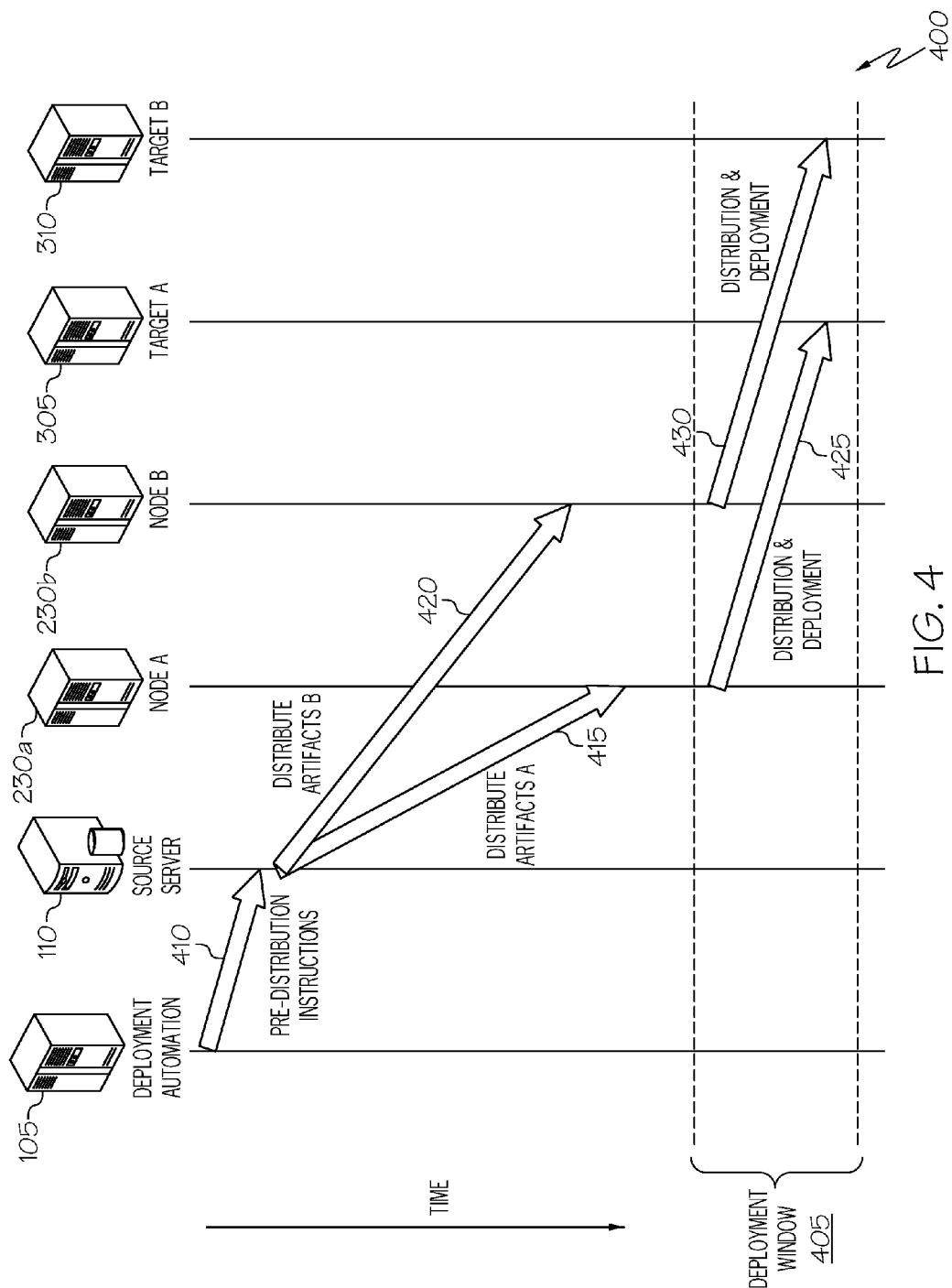
FIG. 4 is a simplified block diagram illustrating an example deployment of software artifacts in accordance with at least one embodiment.

Turning to FIG. 4, a diagram 400 is shown representing an example pre-distribution performed in connection with a deployment of a various resource artifacts on target devices 305, 310. A deployment window 405 can be defined for the deployment. A user can select that an automated pre-distribution of the artifacts take place to position copies of the artifacts in cache nodes (e.g., execution servers 230*a,b*) in advance of the deployment window 405. A deployment automation system 105 can determine that artifacts destined for deployment on target device 305 are to be cached at node 230*a*, while artifacts destined for deployment on target device 310 are to be cached on a different node 230*b*. Accordingly, the deployment automation system 105 can cause (e.g., at 410) the artifacts to be distributed (e.g., 415, 420) to the nodes 230*a,b*. In some cases, the pre-distribution 415, 420 of the artifacts can be launched and may begin being performed immediately upon a user triggering the pre-distribution. In other cases, the pre-distributions 415, 420 can be scheduled in connection with a request to pre-distribute the artifacts in the corresponding deployment.

Continuing with the example of FIG. 4, nodes 230*a,b* can cache copies of the pre-distributed artifacts (received over one or more network from source server 110) until the deployment window 405 opens and the target devices 305, 310 are available to have the artifacts further distributed from the nodes 230*a,b* to the corresponding target devices 305, 310. A deployment automation engine 105 can then complete deployment (at 425, 430) of the respective artifacts on the target devices 305, 310, for instance, according to deployment plan modules developed for automated deployment of the artifacts.

Figure 5A:
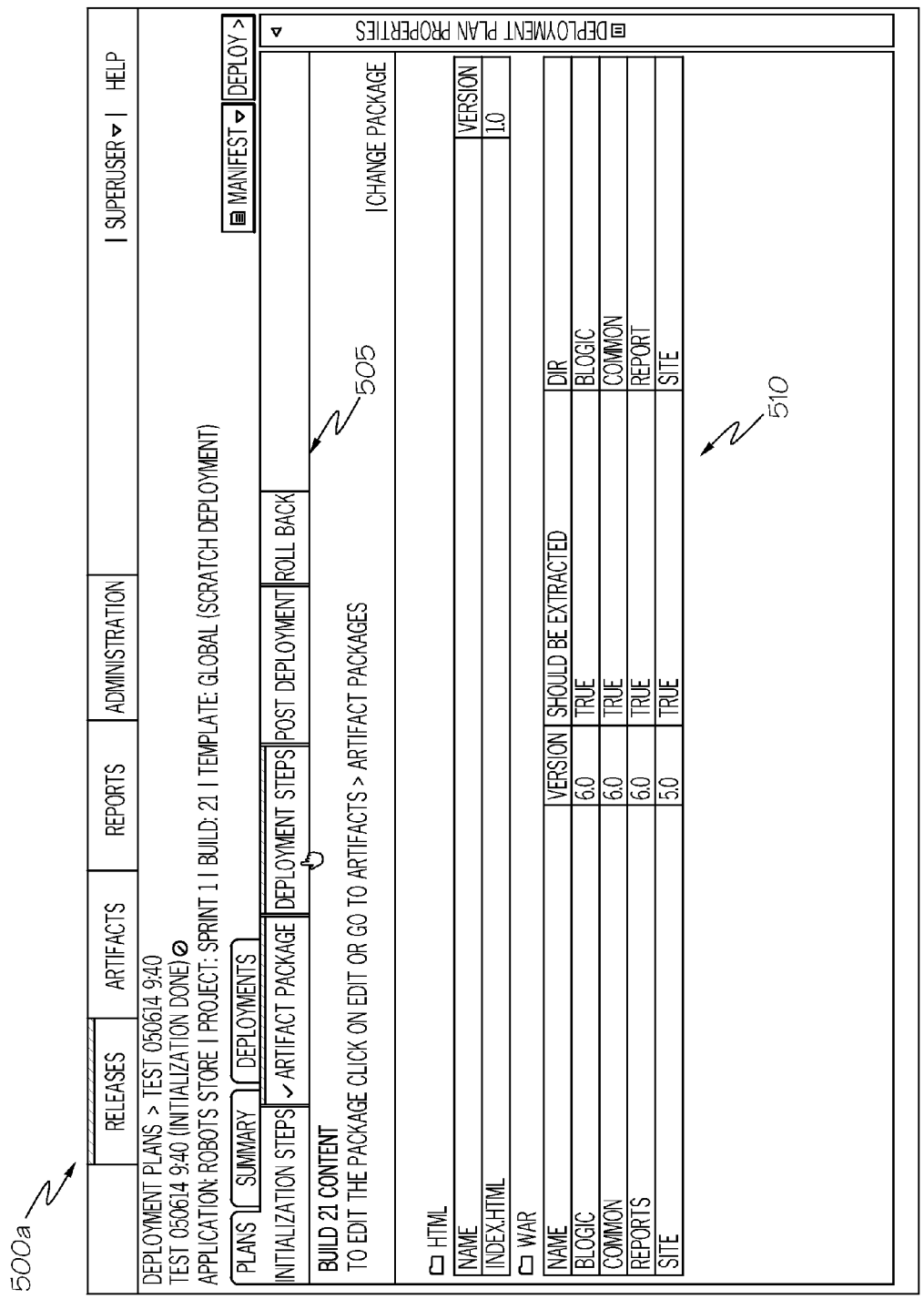

FIGS. 5A-5I are screenshots 500*a-i* illustrating example user interfaces for use in connection with a deployment that can include pre-distribution of release artifacts. For instance, the screenshot 500*a* of FIG. 5A shows an example user interface for viewing details of, editing, and building deployment automation data such as deployment logic (or "templates") to describe the flow of steps to be performed during the deployment, release data identifying (and in some cases including) the artifacts to be deployed, and environmental data identifying and describing configurations of the targets of the deployment. For instance, a user can view various aspects of the deployment plan by navigating through menu 505. In the example of FIG. 5A, a view of the Artifact Package of the deployment plan can be viewed. The artifact package can list all of the artifacts to be deployed in the deployment, as provided and defined in a release data module. For instance, in this example, a release entitled "build 21" can include deployment of an HTML artifact named index.html and multiple Web application Archive (WAR) artifacts (e.g., "blogic," "common", "reports," and "site") can be provided for deployment. Additional information can be provided for the various artifacts, such as their versions, information concerning their source and extraction, etc. Release data modules can also be defined by users. In some cases, release data can be provided as an XML file that can be parsed to identify the artifacts to be deployed together with any artifact-specific attributes and other relevant information.

Figure 5B:
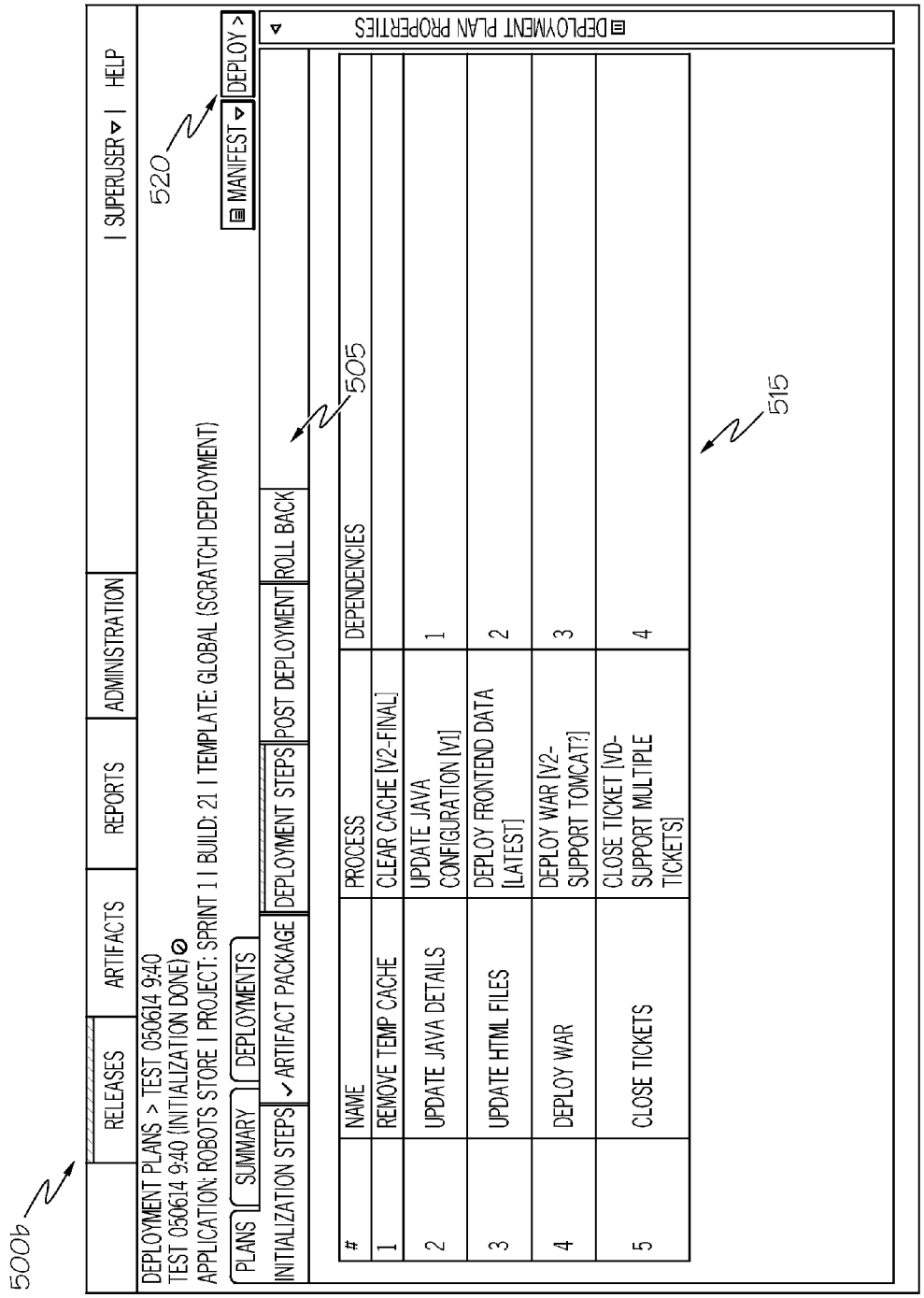
Figure 5C:
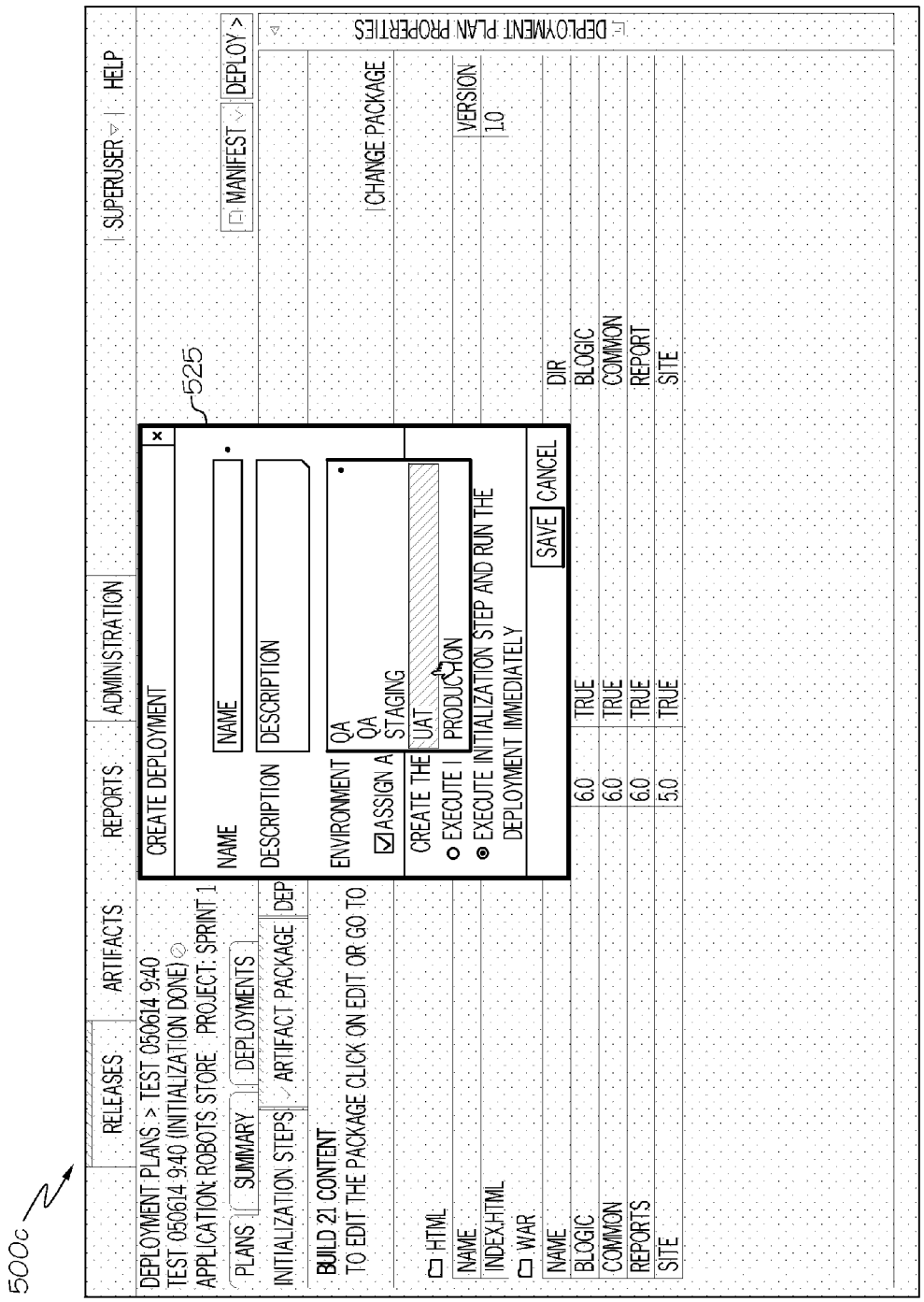

Continuing with the previous example, the artifacts shown in view 510 can correspond to release data that has been paired with a deployment logic template to form the corresponding deployment plan. Turning to FIG. 5B, a user can select to view the deployment steps as provided by deployment logic data (e.g., as presented in view 515). The view 515 can also present dependencies defined for each step. For instance, Step 2 can be defined to be dependent on Step 1, such that Step 2 is to begin following completion of Step 1, among other examples. Indeed, in some cases, a step may not be dependent on any other step in the deployment logic template. Alternatively, in other cases, a step can dependent on the completion of multiple steps or multiple steps can be dependent upon the same particular step, and so on. In this example, the deployment logic can describe the flow for performing a scratch, or full, deployment of new software on a system. For other types of deployments, other steps and flows can be defined within a corresponding deployment logic template. Through the views provided in the examples of FIGS. 5A and 5B, a user can confirm that the deployment plan is correct and even make last minute changes to either the deployment logic or artifact sets.

Upon confirming that the deployment plan has been accurately defined, the user can select a Deploy button 520 to cause the deployment plan to be scheduled for use in a deployment. In this example, selection of Deploy 520 can cause a window 525 to presented, as show in FIG. 5C, allowing the user to select the target environment on which the deployment plan is to be executed (i.e., to automatically deploy the artifacts on the target environment). Selection of one of the available targets in window 525 can cause the deployment plan to be associated with environmental data corresponding to the selected target. The association of a deployment plan with a selected target can define a deployment object. The deployment object can be saved and held until the deployment is scheduled or is to be manually launched by the deployment automation system. For instance, in the example of FIG. 5C, a user can select a particular one of the available environments (e.g., "UAT" (User Acceptance Testing)) to cause the deployment plan (e.g., illustrated in FIGS. 5A-5B) to be paired with the environmental data corresponding to the selected environment.

As discussed above, a deployment plan can be generated from deployment logic templates and release data to map particular steps to particular artifacts' to be accessed and/or deployed in the step. Further, pairing the deployment plan to given environmental data can cause a deployment automation system to map further steps (as well as artifact deployments) to corresponding target machines identified in the environmental data and the machine's respective configuration information. For instance, a deployment step can involve accessing a target's database and inserting data into one or more tables of the database. The deployment object can map, within a deployment object, configuration information identifying an address of the database and the database's access parameters (e.g., password, username, etc.) to the step described in the deployment logic template.

Information included in a deployment object can also be made available for inspection to a user through one or more graphical user interfaces. For instance, as shown in the screenshot 500*d* of FIG. 5D, views 530, 535, 540, 545 are presented in a graphical user interface summarizing a deployment object created from a pairing of the example deployment plan of FIGS. 5A and 5B with an environmental data module corresponding to a Quality Assurance (QA) environment. View 530 can summarize general characteristics of the deployment, including a project and application addressed by the release, as well as the target system (e.g., "QA"), the deployment logic template employed (e.g., a deployment logic modules named "Global/Scratch Deployment") and the deployment plan object corresponding to the deployment (e.g., a deployment plan named "Test 050614 9:40"). Timing of the deployment can also be specified (automatically or by a user), for instance, to schedule the launch of the deployment within a particular deployment window. Window 535 can present a view of the deployment progress. As the stages of the deployment (e.g., validation, artifact distribution to execution servers, distribution of artifacts to deployment agents (or caches), deployment, and post-deployment) progress, GUI elements can be presented to indicate the progress and controls may also be presented to allow a user to launch (or pause or cancel) the automated handling of the current or next stage of the deployment, among other examples. A view 540 can also be provided allowing a user to view additional deployment properties.

Figure 5D:
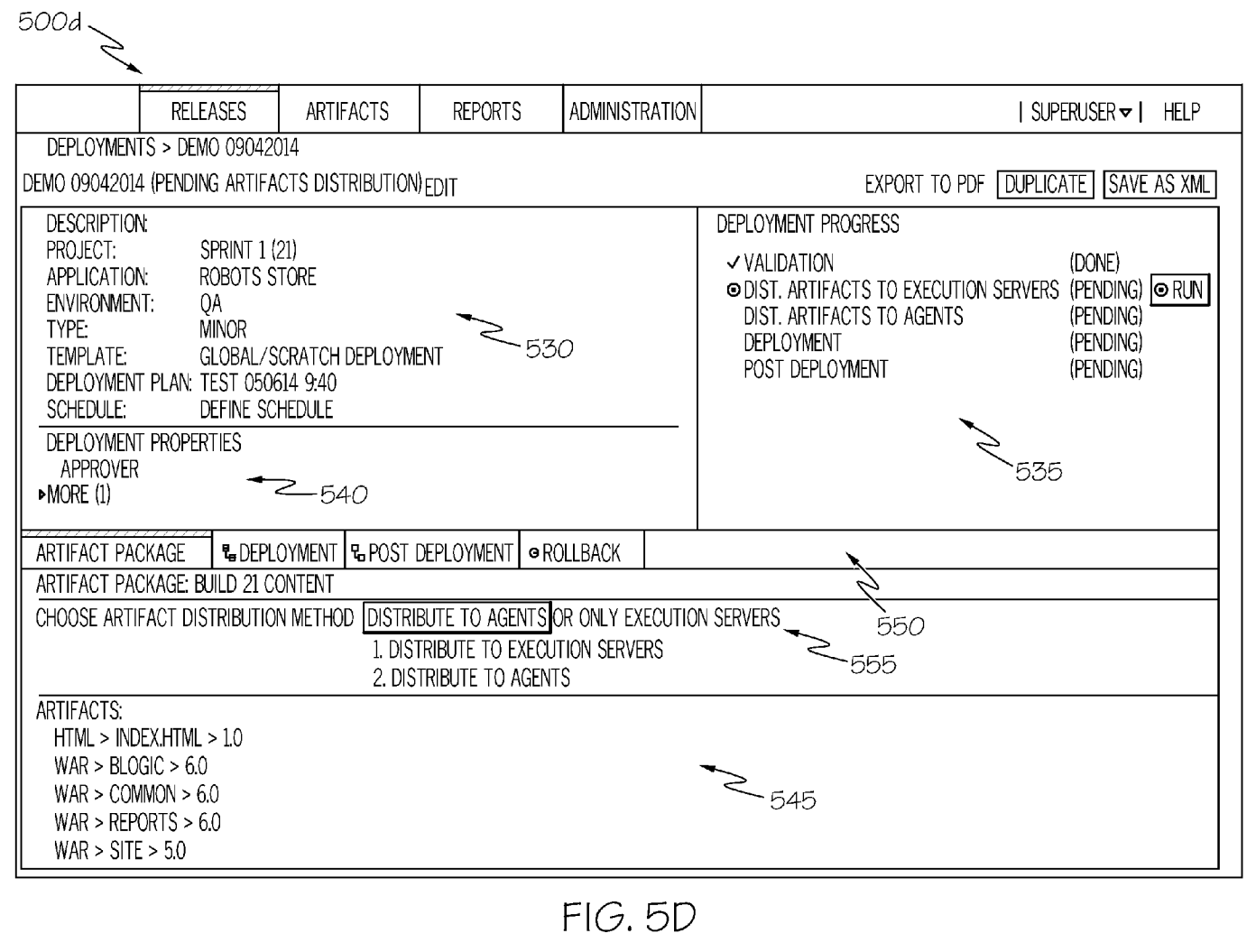

Continuing with the example of FIG. 5D, a pane 545 can be provided to allow users to view various aspects of the deployment. For instance, as shown in the example of FIG. 5D, a view of the "Artifact Package" is selected in the menu 550 and the listing of the artifacts to be deployed are presented. Further, controls 555 can be provided to allow a user to request that one or more of the artifacts be pre-distributed in connection with the deployment (e.g., defined by a deployment object). For instance, a user can elect to either have the artifacts be distributed directly to the target machines (or "Agents") prior to being deployed (i.e., being made operable) on the same target machine, or to first have the artifacts distributed to execution server cache(s) determined to correspond with the target machines to make the distribution to the target machines more efficient prior to the deployment (e.g., to make better use of a scheduled window of availability of the target machine in the deployment). In some implementations, the distribution technique (e.g., directly to the target machine or first to server caches) can be selected on an artifact-by-artifact basis or for an entire artifact set (or "package"), among other example features.

Figure 5E:
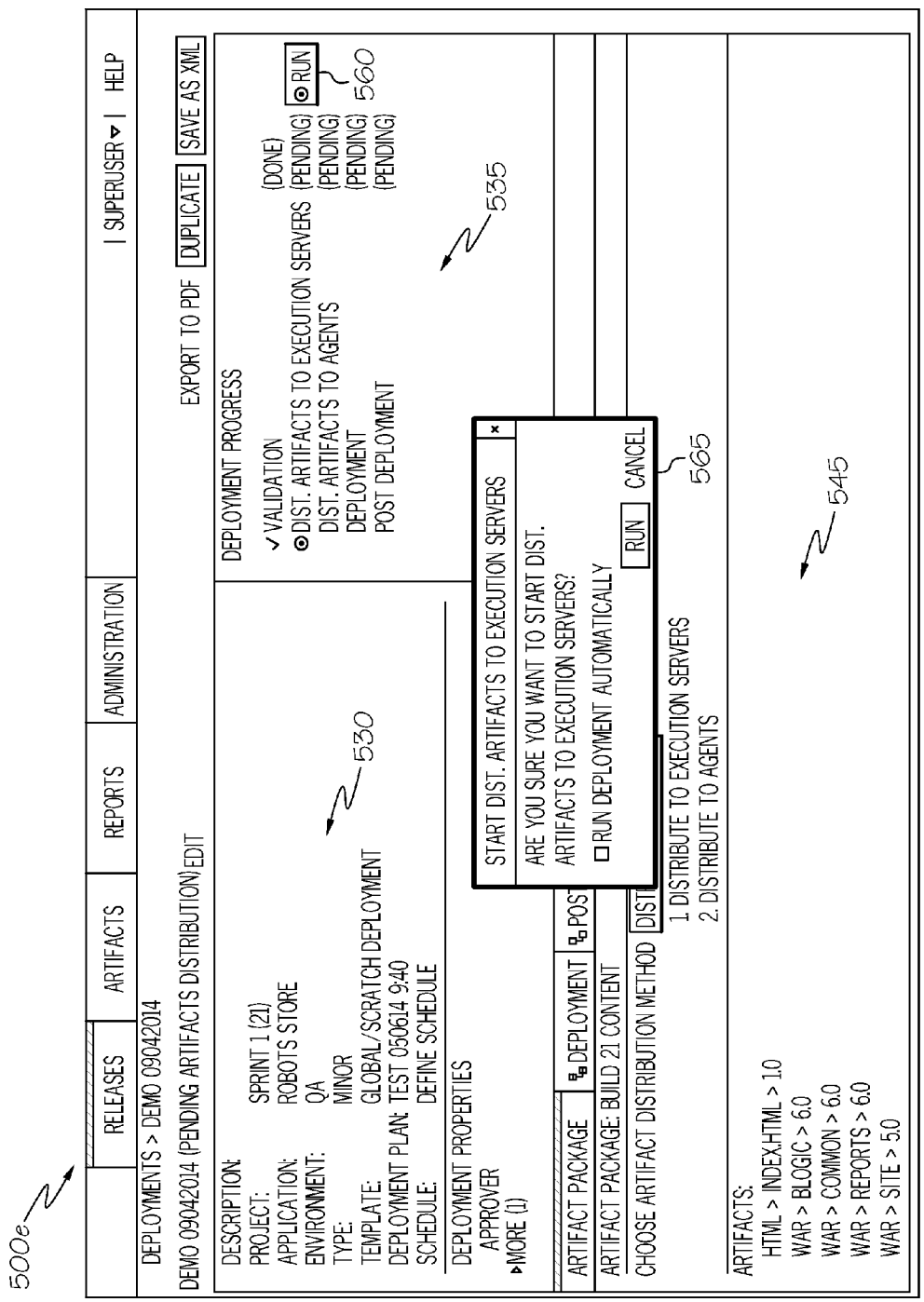

Turning to FIG. 5E, a user has selected to proceed with a deployment that includes pre-distribution of artifacts to one or more caches separate from the target machines. Deployment Progress view 535 can indicate that a validation stage has been completed, allowing a pre-distribution step to be available. In some implementations, such as shown in FIG. 5E, a user can select when to begin the pre-distribution. Deployment automation logic can determine (i.e., without the user's involvement) which execution servers to pre-distribute the artifacts to, with the user designating when the pre-distribution should occur. For instance, a user can select control 560 to run the pre-distribution step to pre-distribute designated artifacts to the execution servers determined to best positioned relative to the artifacts' respective target devices. In other instances, a user can schedule a time or window for subsequently beginning the pre-distribution. In the example of FIG. 5E, after selecting control 560, a user can be presented with a confirmation window 565 to confirm that the pre-distribution is to begin. The window 565 can also allow a user to indicate that deployment automation logic is to operate autonomously from this point forward (e.g., through the selection of the "Run Deployment Automatically" checkbox) such that all remaining steps in the deployment are carried out autonomously by the deployment automation system (without further input or intervention of the user).

Figure 5G:
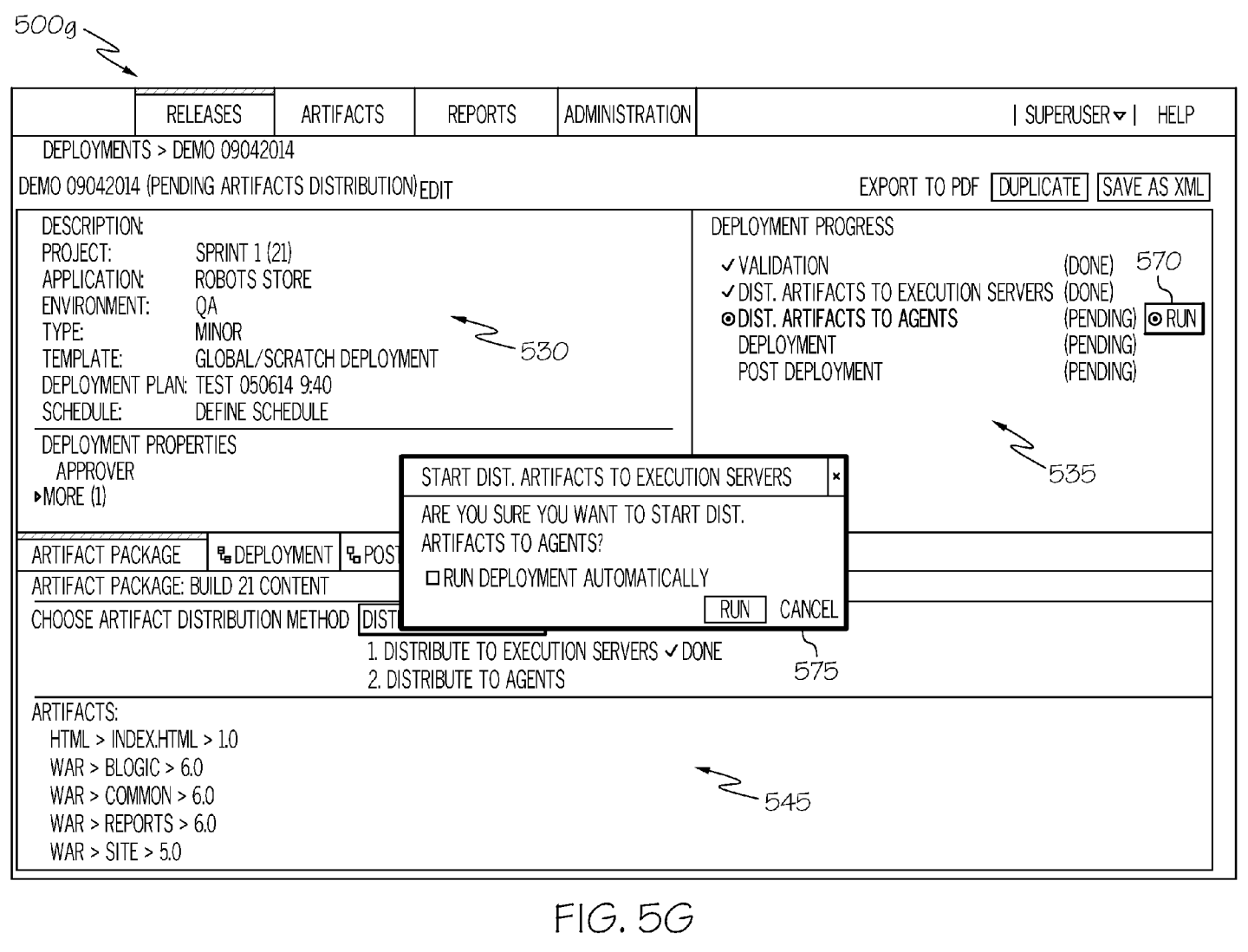

Turning to FIG. 5F, after artifacts have been pre-distributed to cache locations (e.g., execution servers corresponding to the artifacts' respective targets), the artifacts are still to be further distributed onward to the target machines. In some instances, a user can be provided with opportunities to designate when the artifacts are to be forwarded onto their targets for eventual deployment on those devices. For instance, after pre-distribution of artifacts has completed (or following validation in cases when the artifacts are distributed directly to their targets (without pre-distribution)), a control 570 can be made available to allow a user to launch (or schedule the launch) of the distribution of the artifacts to their target devices. As in the example of FIG. 5E, and as shown in FIG. 5G, after selecting to proceed with distribution of the artifacts to the target machines (e.g., by selecting control 570), a similar confirmation window 575 can be presented to the user to confirm that the distribution is to proceed. The user can also designate that subsequent steps of the deployment are to proceed automatically, among other examples. FIG. 5H shows that the status of the pre-distribution and distribution steps can be also presented in the user interface(s) of a deployment automation system (e.g., in view 545). For instance, the example of FIG. 5H shows a user that artifacts are currently being distributed to their respective target devices in preparation for remaining deployment activities to make the artifacts operable on their targets.

Figure 5I:
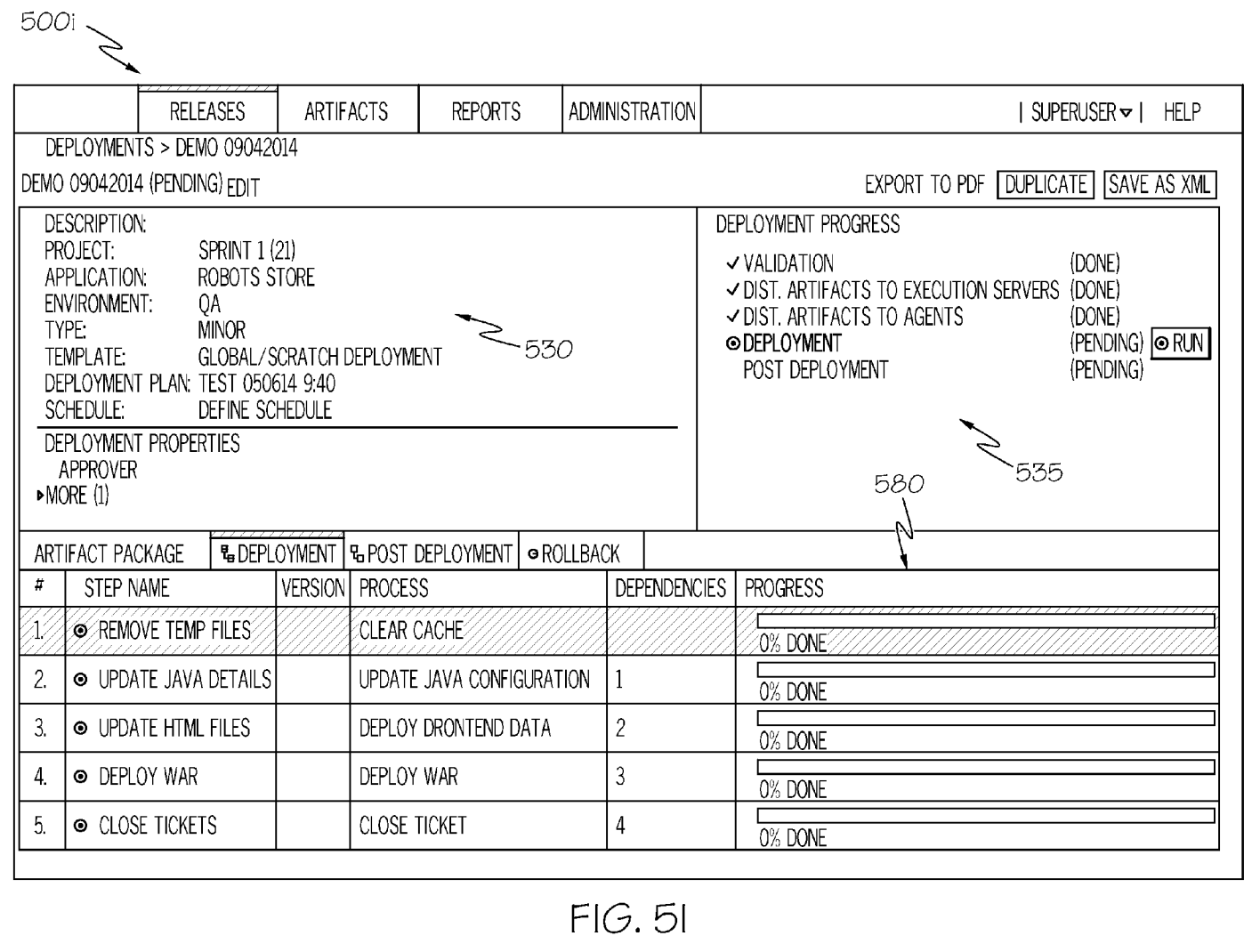

Upon distribution of artifacts on the target devices, additional deployment steps can be performed. For instance, a deployment automation engine can determine the steps to perform in the deployment as well as which artifacts and targets correspond to each step. The deployment automation engine can further proceed with performing these steps to complete the deployment automatically, without intervention or further direction of a user. The user can, however, monitor the deployment automation engine's performance of the deployment steps. For instance, as shown in the example of FIG. 5I, a presentation 580 is provided to indicate the progress, on a deployment step by deployment step basis, of the deployment of the artifacts distributed to the target devices, allowing a more detailed view of the deployment progress represented in view 535.

Figure 6:
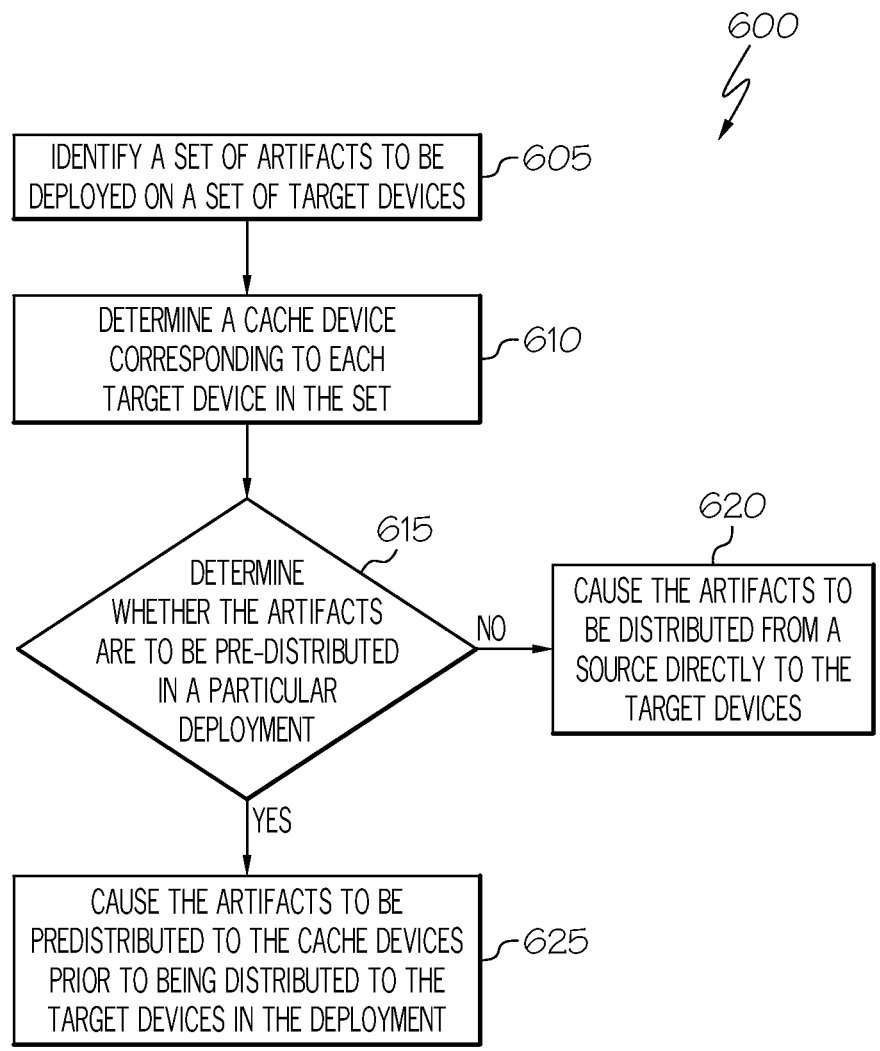
FIG. 6 is a simplified flowchart illustrating example techniques in connection with automated deployment of software on a target system in accordance with at least one embodiment.

Turning to FIG. 6, a simplified flowchart 600 is shown illustrating example techniques involved in an automated deployment of software on a target system. For instance, a set of artifacts can be identified 605 that are to be deployed upon a particular set of target devices. The set of target devices can include one or more distinct devices, including remote devices coupled in a network. A cache device can be determined 610 for each of the target devices. In some cases, multiple target devices in the set can share the same cache device, while in other instances, distinct cache devices can be determined for two or more of the target devices. In a deployment of the artifact on the target devices, it can be determined 615 whether to pre-distribute the artifacts from their source(s) to the cache device(s). For instance, a user can select to pre-distribute the artifact in an automation of the deployment. In some cases, the cache devices can be determined 610 based on a determination that the deployment is to involve a pre-distribution of the artifacts on cache devices. If pre-distribution is not determined, the artifacts can be caused 620 to be distributed from their source(s), over one or more networks, to the target devices whereon the artifacts are to be deployed. If pre-distribution is determined, each artifact in the set of artifacts is caused 625 to be pre-distributed to the cache device corresponding to the target device whereon the respective artifact is to be deployed. The pre-distribution may be to complete prior to the beginning of the deployment. The pre-distribution can be in advance of, and in anticipation of, a limited window of availability wherein the deployment is to be completed on the target devices, among other implementations.

The flowcharts and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The invention claimed is:

1. A method comprising:
    identifying a set of artifacts to be deployed on a target device in a deployment, wherein a source of the set of artifacts comprises a source computing system remote from the target device;
    determining a cache device corresponding to the target device, wherein the cache device is separate from the target device, wherein determining the cache device comprises selecting the cache device from a plurality of cache devices based on availability of the cache device and a proximity of the cache device to the target device to attempt to realize a time savings in delivery of the set of artifacts on to the target device; and causing the set of artifacts to be pre-distributed on the cache device in advance of the deployment, wherein the set of artifacts are to be sent to the cache device from the source computing system, the set of artifacts are to be held at the cache device prior to the artifacts being distributed to the target device, and the deployment is to follow distribution of the set of artifacts on the target device.

2. The method of claim 1, wherein copies of the set of artifacts are cached at the cache device following the pre-distributing and the set of artifacts are distributed to the target device from the cache device.

3. The method of claim 1, wherein the deployment is to make the artifacts operable on the target device.

4. The method of claim 3, wherein the deployment is performed autonomously, using a computing device, based on deployment data.

5. The method of claim 4, wherein the deployment data comprises deployment step logic, environment data describing attributes of the target device, and artifact data corresponding to the set of artifacts.

6. The method of claim 5, wherein the target device is identified from the environment data.

7. The method of claim 1, further comprising determining the proximity.

8. The method of claim 1, wherein the cache device is associated with the target device.

9. The method of claim 8, wherein the association comprises a static association between the cache device and the target device.

10. The method of claim 8, wherein the association comprises a dynamic association between the cache device and the target device, and the target device is associated with another one of the plurality of cache devices in another deployment.

11. The method of claim 1, wherein a window of time is defined for the deployment, and the pre-distribution of the set of artifacts on the cache device is to complete prior to a start of the window.

12. The method of claim 1, wherein a time savings is realized by delivering the set of artifacts on to the target device from the cache device rather than directly from the source computing system.

13. The method of claim 1, wherein a respective cache device is determined for each of the plurality of target devices, and the cache device determined for the particular target device is different from the cache device determined for at least one other target device in the plurality of target devices.

14. A computer program product comprising a computer readable storage medium comprising computer readable program code embodied therewith, the computer readable program code comprising:

computer readable program code configured to identify a set of artifacts to be deployed on a target device in a deployment, wherein a source of the set of artifacts comprises a source computing system remote from the target device;

computer readable program code configured to determine a cache device corresponding to the target device, wherein the cache device is separate from the target device, and determining the cache device comprises selecting the cache device from a plurality of cache devices based on availability of the cache device and a proximity of the cache device to the target device to attempt to realize a time savings in delivery of the set of artifacts on to the target device; and computer readable program code configured to cause the set of artifacts to be pre-distributed on the cache device in advance of the deployment, wherein the set of artifacts are to be sent to the cache device from the source computing system, the set of artifacts are to be held at the cache device prior to the artifacts being distributed to the target device, and the deployment is to follow distribution of the set of artifacts on the target device.

15. A system comprising:

a processor;

a memory element;

a deployment automation engine to:

identify a set of artifacts to be deployed on a target device in a deployment, wherein a source of the set of artifacts comprises a source computing system remote from the target device;

determine a cache device corresponding to the target device, wherein the cache device is separate from the target device, and determining the cache device comprises selecting the cache device from a plurality of cache devices based on availability of the cache device and a proximity of the cache device to the target device to attempt to realize a time savings in delivery of the set of artifacts on to the target device; and cause the set of artifacts to be pre-distributed on the cache device in advance of the deployment, wherein the set of artifacts are to be sent to the cache device from the source computing system, the set of artifacts are to be held at the cache device prior to the artifacts being distributed to the target device, and the deployment is to follow distribution of the set of artifacts on the target device.

16. The system of claim 15, wherein the deployment automation engine is further to automate deployment of the artifacts on the target devices.

* * * * *